US009244192B2

(12) United States Patent
Cullen et al.

(10) Patent No.: US 9,244,192 B2
(45) Date of Patent: Jan. 26, 2016

(54) PRECIPITATION SENSOR

(71) Applicant: Airmar Technology Corporation, Milford, NH (US)

(72) Inventors: Robert M. Cullen, Temple, NH (US); Chad Lawrence Andrews, Greenfield, NH (US); Frederic Schoff Boericke, II, Mont Vernon, NH (US); Stephen G. Boucher, Amherst, NH (US); Roger Henry Tancrell, Wilmington, MA (US)

(73) Assignee: Airmar Technology Corporation, Milford, NH (US)

( * ) Notice: Subject to any disclaimer, the term of this patent is extended or adjusted under 35 U.S.C. 154(b) by 37 days.

(21) Appl. No.: 14/215,710

(22) Filed: Mar. 17, 2014

(65) Prior Publication Data

US 2014/0245829 A1 Sep. 4, 2014

Related U.S. Application Data

(63) Continuation of application No. 13/449,763, filed on Apr. 18, 2012, now Pat. No. 8,714,007.

(60) Provisional application No. 61/480,556, filed on Apr. 29, 2011.

(51) Int. Cl.
*G01W 1/14* (2006.01)
(52) U.S. Cl.
CPC ....................................... *G01W 1/14* (2013.01)
(58) Field of Classification Search
CPC ........................................................ G01W 1/14
USPC ............................................. 73/170.21, 170
See application file for complete search history.

(56) References Cited

U.S. PATENT DOCUMENTS 3,141,330 A 7/1964 Murray et al.
3,830,103 A 8/1974 Andrejkovics et al.
(Continued)

FOREIGN PATENT DOCUMENTS

DE 4434432 A1 3/1996
DE 4439048 A1 5/1996
(Continued)

OTHER PUBLICATIONS

Halbakery, Home weather station with bucketless electronic rain gauge, URL: http://www.halfbakery.com/idea/Home_20weather_20station_20with_20bucketless_20electronic_20rain_20_gauge, downloaded Apr. 29, 2010.

(Continued)

*Primary Examiner* — Lisa Caputo
*Assistant Examiner* — Jamel Williams
(74) *Attorney, Agent, or Firm* — Hamilton, Brook, Smith & Reynolds, P.C.

(57) ABSTRACT

A precipitation sensor including a cantilevered sensor member having a cantilevered portion and an upper and a lower surface extending on opposite sides of the cantilevered portion. The sensor member can receive falling precipitation on the upper surface and vibrate when struck by such precipitation. The cantilevered portion can have outer perimeter edges that are sloped downwardly for shedding the precipitation off the cantilevered portion. An electromechanical sensor can be incorporated with at least a part of the cantilevered portion of the sensor member for sensing the vibrations of the sensor member caused by the precipitation, and generating an electrical response from which precipitation properties can be determined. A support structure can be connected to the lower surface of the cantilevered portion at about a central region of the sensor member for supporting the sensor member. The cantilevered portion extends outwardly beyond the support structure.

35 Claims, 11 Drawing Sheets

(56) References Cited

U.S. PATENT DOCUMENTS

| | | | |
|---|---|---|---|
| 4,527,105 | A | 7/1985 | Shiraishi |
| 4,542,325 | A | 9/1985 | Kobayashi et al. |
| 4,584,508 | A | 4/1986 | Kobayashi et al. |
| 4,603,316 | A | 7/1986 | Kobayashi et al. |
| 4,881,019 | A | 11/1989 | Shiraishi et al. |
| 5,125,268 | A | 6/1992 | Caron |
| 5,138,241 | A | 8/1992 | Shimizu et al. |
| 5,203,207 | A | 4/1993 | Sugiyama |
| 5,421,198 | A | 6/1995 | More, III et al. |
| 5,528,224 | A | 6/1996 | Wang |
| 6,044,699 | A | 4/2000 | Greenblatt et al. |
| 6,892,580 | B2 | 5/2005 | Pankey et al. |
| 6,936,985 | B2 | 8/2005 | Pankey et al. |
| 7,249,502 | B2 | 7/2007 | Luukkala et al. |
| 7,286,935 | B2 | 10/2007 | Aspola et al. |
| 7,340,949 | B1 | 3/2008 | Hage |
| 7,552,632 | B2 * | 6/2009 | Runge .......... A01G 25/167 73/170.16 |
| 7,696,710 | B2 | 4/2010 | Byrne et al. |
| 7,739,973 | B2 | 6/2010 | Boucher et al. |
| D625,622 | S * | 10/2010 | Mallela .................. D10/56 |
| 8,448,507 | B2 | 5/2013 | Salmi et al. |
| 8,573,049 | B1 * | 11/2013 | Ware .............. G01W 1/14 73/170.17 |
| 2004/0140903 | A1 | 7/2004 | Buhler |
| 2008/0222827 | A1 | 9/2008 | Veerasamy |
| 2008/0265913 | A1 | 10/2008 | Netzer |
| 2012/0272726 | A1 | 11/2012 | Cullen |

FOREIGN PATENT DOCUMENTS

| | | | |
|---|---|---|---|
| EP | 0360892 | A1 | 4/1990 |
| EP | 0390063 | A2 | 10/1990 |
| EP | 0422553 | A1 | 4/1991 |
| EP | 1083423 | A2 | 3/2001 |
| FR | 2595473 | A1 | 9/1987 |
| JP | 60169790 | A | 9/1985 |
| JP | 61 139775 | | 6/1986 |
| JP | 62194958 | A | 8/1987 |
| JP | 1080897 | A | 3/1989 |
| JP | 2195250 | A | 8/1990 |
| JP | 02300692 | A | 12/1990 |
| JP | 4020853 | A | 1/1992 |
| JP | 9101377 | A | 4/1997 |
| WO | WO 2009/003473 | A1 | 1/2009 |
| WO | WO 2010/122223 | A1 | 10/2010 |

OTHER PUBLICATIONS

Salmi, A. and Ikonen, J., "Piezoelectric Precipitation Sensor From Vaisala," WMO Technical Conference on Meterological and Environmental Instruments and Methods of Observation, 2005.

Vaisala RAINCAP® Sensor Technology, downloaded from www.vaisala.com, at least by May 5, 2010.

Notification of Transmittal of the International Search Report and the Written Opinion of the International Searching Authority for PCT/US2012/034027, entitled: "Precipitation Sensor", mailed Aug. 10, 2012.

International Preliminary Report on Patentability and Written Opinion, for PCT/US2012/034027, entitled: "Precipitation Sensor," date of mailing Nov. 7, 2013.

\* cited by examiner

PRECIPITATION SENSOR

RELATED APPLICATION(S)

This application is a continuation of U.S. application Ser. No. 13/449,763, filed Apr. 18, 2012, which claims the benefit of U.S. Provisional Application No. 61/480,556, filed on Apr. 29, 2011. The entire teachings of the above applications are incorporated herein by reference.

BACKGROUND

A typical standard rain gauge is a container designed for accommodating several inches of rain. The observer measures the amount of rain and empties the container. Another type of rain gauge is a tipping bucket which tips water to the ground when a certain weight of rain falls into it, and a recorder records the amount. The drawback with such rain gauges can be the large size, the personal attention required, or the mechanical complexity.

SUMMARY

The present invention can provide a precipitation sensor, such as a rain sensor, which can be mechanically simple and compact, allowing use in a variety of applications, for example, mobile applications and remote locations. The precipitation sensor can include a cantilevered sensor member having a cantilevered portion and an upper and a lower surface extending on opposite sides of the cantilevered portion. The sensor member can receive falling precipitation on the upper surface and vibrate when struck by such precipitation. The cantilevered portion can have outer perimeter edges that are sloped downwardly for shedding the precipitation off the cantilevered portion. An electromechanical sensor can be incorporated with at least a part of the cantilevered portion of the sensor member, for example, on, embedded within, or itself forming at least a part thereof, for sensing the vibrations of the sensor member caused by the precipitation, and generating an electrical response from which precipitation properties can be determined. A support structure can be connected to the lower surface of the cantilevered portion at about a central region of the sensor member for supporting the sensor member. The cantilevered portion extends outwardly beyond the support structure.

In particular embodiments, the support structure can be a rigid support structure for rigidly supporting the sensor member. The sensor member can have a generally round outer perimeter. The support structure can be a post that supports the sensor member at about the central region, whereby the cantilevered portion of the sensor member is generally annular. The precipitation can be rain, and the outer perimeter of the cantilevered portion can have a sharp edge for minimizing water droplet size hanging on the edge of the outer perimeter by surface tension. In some embodiments, the upper surface can include a scalloped surface with downwardly sloping arched ridges extending to the outer perimeter. In addition, in some embodiments, at least a portion of the sensor member can include a hydrophilic material for shedding water droplets. The support structure can be in some embodiments, connected to the lower surface of the sensor member at an asymmetrical location.

In some embodiments, the electromechanical sensor can be a strain sensor attached to the lower surface of the sensor member. The strain sensor can be a piezoelectric polymer strip having one direction with high sensitivity and another direction with low sensitivity. The piezoelectric polymer strip can be oriented to align the direction having high sensitivity with selected vibrations to select a particular resonance mode of the sensor member. In some embodiments, more than one strain sensor can be attached to the sensor member, and the electrical response of the more than one strain sensor can be compared with each other. The precipitation sensor can be mounted to a weather sensor assembly by the support structure. The weather sensor assembly can include sensors for determining one or more of GPS location, travel speed, tilt, compass heading, humidity, barometric pressure, temperature, wind speed and wind direction. The sensor member can be vibrationally damped, and can be formed of vibrationally damped material, such as polymeric material.

The present invention can also provide a precipitation sensor including a cantilevered sensor member having a cantilevered portion and an upper and a lower surface extending on opposite sides of the cantilevered portion. The sensor member can receive falling precipitation on the upper surface and vibrate when struck by such precipitation. The cantilevered portion can have a generally round outer perimeter with outer perimeter edges that are sloped downwardly for shedding the precipitation off the cantilevered portion. A piezoelectric sensor can be attached to the lower surface of the cantilevered portion of the sensor member for sensing vibrations of the sensor member caused by the precipitation, and generate an electrical response from which precipitation properties can be determined. A rigid post can be connected to the lower surface of the cantilevered portion at about a central region of the sensor member for rigidly supporting the sensor member. The cantilevered portion can be generally annular and extend outwardly beyond the support structure.

The present invention can also provide a method of sensing precipitation including vibrating a cantilevered sensor member with falling precipitation. The cantilevered sensor member can have a cantilevered portion and an upper and a lower surface extending on opposite sides of the cantilevered portion. The sensor member can receive falling precipitation on the upper surface and vibrate when struck by such precipitation. The cantilevered portion can have outer perimeter edges that are sloped downwardly for shedding the precipitation off the cantilevered portion. Vibrations of the sensor member caused by the precipitation can be sensed with an electromechanical sensor incorporated with at least a part of the cantilevered portion of the sensor member, for example, on, embedded within, or itself forming at least a part thereof and generate an electrical response from which precipitation properties can be determined. The sensor member can be supported by a support structure connected to the lower surface of the cantilevered portion at about a central region of the sensor member. The cantilevered portion can extend outwardly beyond the support structure.

In particular embodiments, the sensor member can be rigidly supported with a rigid support structure. The sensor member can have a generally round outer perimeter. The sensor member can be supported at about the central region with a post, whereby the cantilevered portion of the sensor member can be generally annular. The precipitation can be rain. Water droplet size hanging on the edge of the outer perimeter by surface tension can be minimized by providing the outer perimeter of the cantilevered portion with a sharp edge. In some embodiments, the upper surface of the cantilevered portion can have a scalloped surface with downwardly sloping arched ridges extending to the outer perimeter. In addition, in some embodiments, at least a portion of the sensor member can have a hydrophilic material for shedding water droplets. The support structure can be in some embodiments, connected to the lower surface of the sensor member at an asymmetrical location.

In some embodiments, a strain sensor can be attached to the lower surface of the sensor member. The strain sensor can be a piezoelectric polymer strip having one direction with high sensitivity and another direction with low sensitivity. The piezoelectric polymer strip can be oriented to align the direction having high sensitivity with selected vibrations to select a particular resonance mode with the sensor member. In some embodiments, more than one strain sensor can be attached to the sensor member, and the electrical response of the more than one strain sensor can be compared with each other. The precipitation sensor can be mounted to a weather sensor assembly with the support structure. The weather sensor assembly can include sensors for determining one or more of GPS location, travel speed, tilt, compass heading, humidity, barometric pressure, temperature, wind speed and wind direction. The sensor member can be vibrationally damped, and can be formed of vibrationally damped material, such as polymeric material.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

Figure 1:
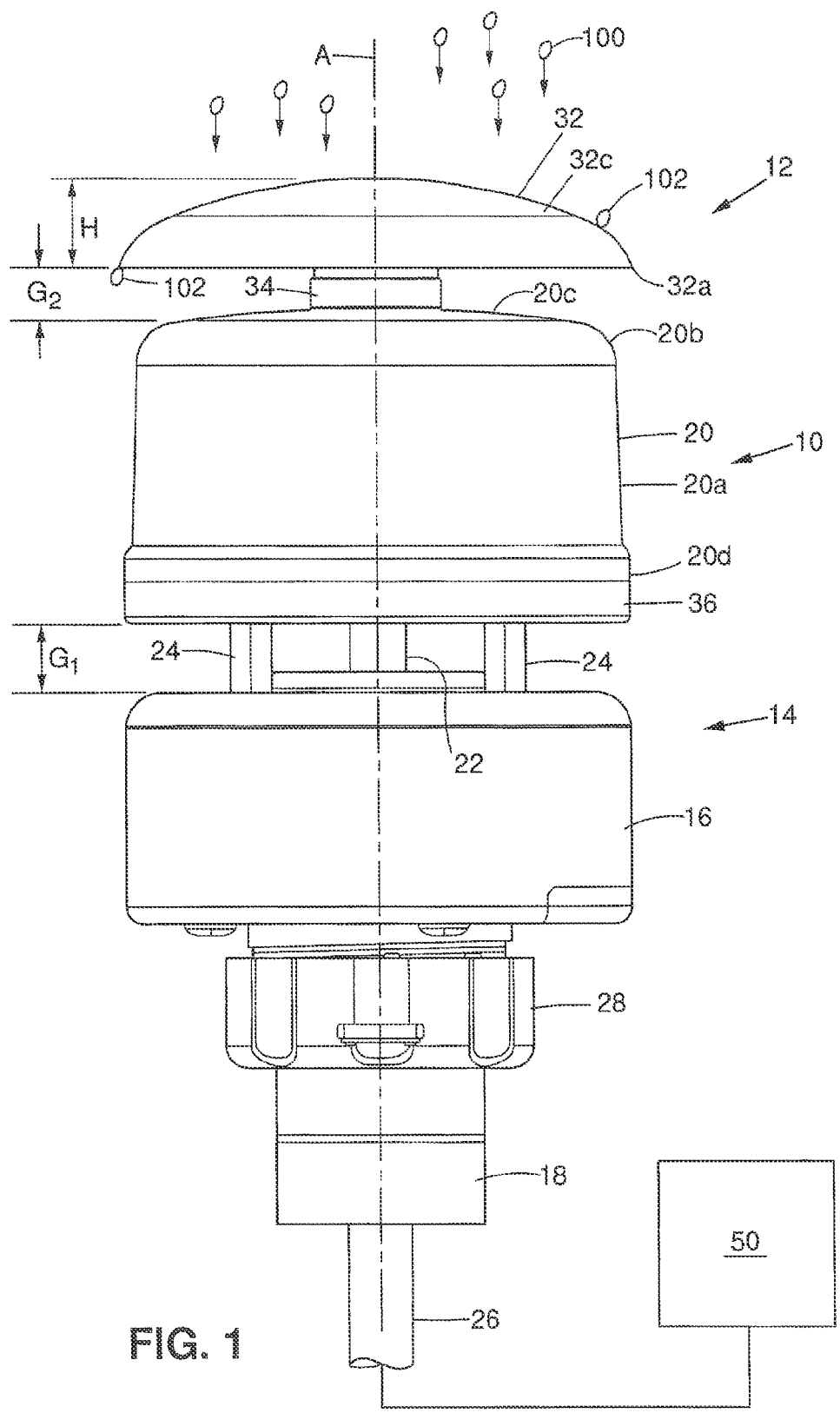
FIG. 1 is a front view of an embodiment of a weather apparatus in the present invention having a precipitation sensor.

Referring to FIG. 1, an embodiment of a weather station, device, assembly or apparatus 10 can include a precipitation detector or sensor 12, for measuring, detecting or sensing precipitation 100, and a lower weather portion, assembly or subassembly 14, for measuring, detecting or sensing various other weather conditions. The weather device 10 can be used in both stationary and mobile applications. The precipitation sensor 12 can be mounted to, included with, or incorporated into the weather subassembly 14 for determining that precipitation is falling, and providing precipitation properties including precipitation rate and amount. The precipitation 100 can include falling water, rain, sleet, hail, or other falling particles or objects.

The weather subassembly 14 can include an upper housing 20 and a lower housing 16 which are separated from each other by a gap $G_1$ and connected together by posts 24 and conduit 22. The housings 16 and 20 can contain and include sensors or electronics as is known in the art, for sensing or providing various weather conditions, as well as information, conditions or properties that are useful in combination with the sensed weather conditions. Conditions and properties can include temperature, humidity, dew point, heat index, wind speed, wind direction, wind chill, barometric pressure and global positioning (GPS). A 3 axis accelerometer, 3 axis compass and gyroscope can also be included to sense directional heading, orientation and movement for mobile applications. A threaded stem or neck 18 can extend downwardly from lower housing 16 on which a threaded nut 28 can be tightened to rigidly secure the weather apparatus 10 within an opening to a desired mounting structure. An electrical cable 26 can extend from the neck 18 of the weather apparatus 10 and can be electrically connected to a desired electrical device 50. Depending upon the application at hand, electrical device 50 can be a viewing console, a computer, a communication device such as a wireless communication device, etc. Some embodiments of weather apparatus 10 and subassembly 14 can include features disclosed in U.S. Pat. No. 7,739,973, issued Jun. 22, 2010, the contents of which are incorporated herein by reference in their entirety.

Figure 2:
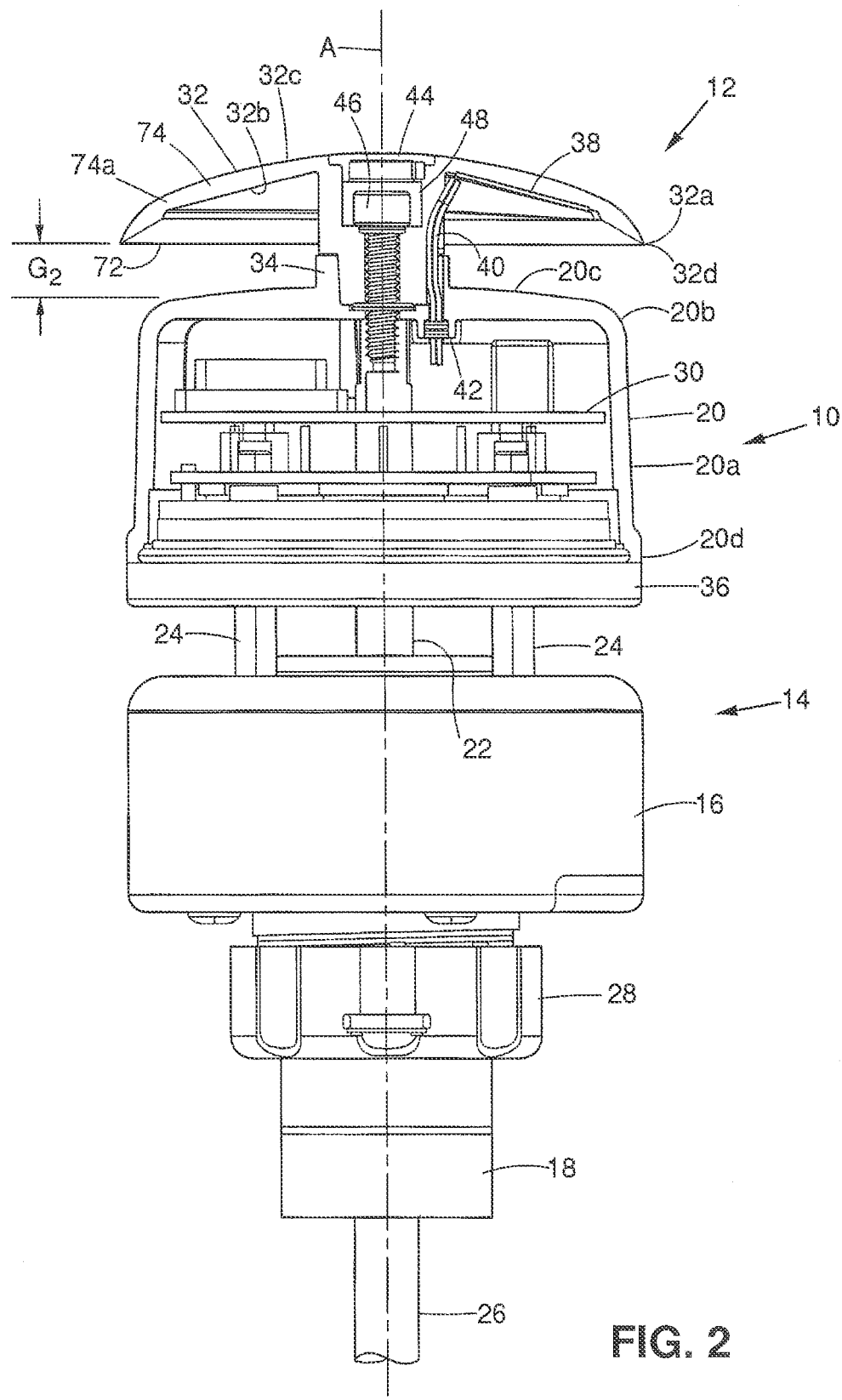
FIG. 2 is a front view of the weather apparatus of FIG. 1 with a portion shown in section.
Figure 3:
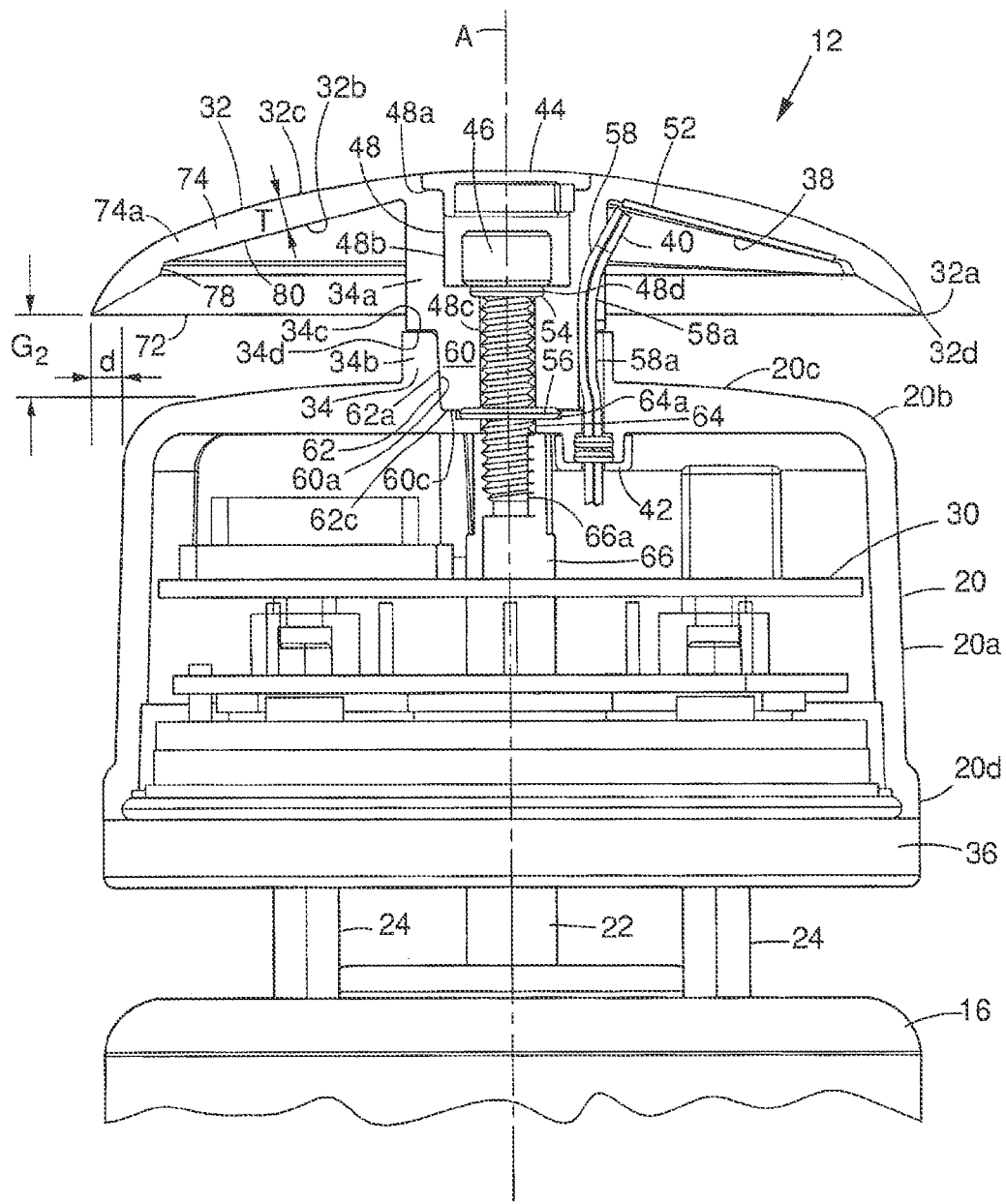
FIG. 3 is an enlarged view of the sectioned portion of FIG. 2.
Figure 5:
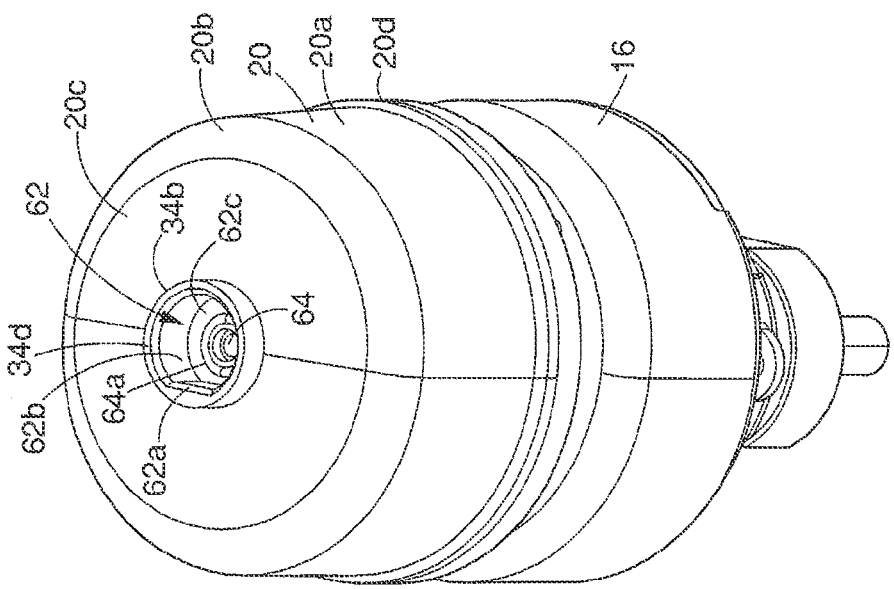
FIG. 5 is a perspective view of the weather apparatus with the sensor member removed.

Referring to FIGS. 1-3, an embodiment of the precipitation sensor 12 can include a cantilevered detector or sensor cap, head, umbrella or member 32, that can be mounted to and above the upper housing 20 with a central support structure or post 34. The post 34 can be generally rigid. The sensor member 32 can have a curved shell or wall 74 having a wall thickness T, and a curved or round outer diameter, rim or perimeter 32a. The sensor member 32 can also have a downwardly sloping generally angled, curved or arched convex top, upper or outer surface 32c, and a concave bottom lower, underside or inner surface 32b extending on the opposite side of the wall 74 of the sensor member 32. An electromechanical sensor 38 can be attached, incorporated, connected or secured to the sensor member 32, such as on the underside surface 32b of an annular cantilevered wall portion 74 of wall 74. Vibrations of the cantilevered sensor member 32 and annular cantilevered wall portion 74a caused by falling precipitation 100 striking the sensor member 32 can be received and sensed by sensor 38, which can generate an electrical response from which precipitation properties can be determined.

In use, precipitation 100 such as water or rain falling on the upper surface 32c of the sensor member 32, vibrates the sensor member 32 with each piece of precipitation 100 or rain striking the sensor member 32. The sensor 38 can be configured and oriented on the sensor member 32 in an alignment and location to sufficiently sense vibrations caused by precipitation 100 that can be associated with the precipitation 100. Positioning the sensor 38 on the annular cantilevered wall portion 74a locates the sensor 38 on a portion of the sensor member 32 that can readily vibrate in a manner that can be sensed. The sensor 38 provides an electrical response or signal in response to vibrations that are sensed, which are transmitted to electronics 30 in upper housing 20. The electronics 30 and/or device 50, can then process the sensed vibrations. The signals generated by the sensor 38 can be processed, where individual signals having particular characteristics, for example signals having selected frequency, magnitude and/or duration, can be identified as individual pieces of falling precipitation 100, a particular precipitation, such as rain drops, and having a particular volume. From this determination, precipitation 100 or rain rate, and total amount of precipitation or rain over a period of time can then be determined.

An example process for detecting precipitation and determining an amount of precipitation over a period of time is now described. The signals generated by the sensor 38, corresponding to vibrations detected at the sensor member 32, may be amplified and converted from analog sensor signals to digital sensor signals. A suitable signal processing methodology may be applied to the digital sensor signals to identify rain drops based on characteristics in the signals, such as rise-time, ring-down time, period of each cycle in the ring-down and the number of zero crossings in the ring-down of the signals. Taking into account the likely size of each detected rain drop, the rain drops identified among the digital sensor signals can be summed over a period of time to provide a measure of total accumulation.

More particular details of embodiments of the weather apparatus 10 and the precipitation sensor 12 now follow. The sensor member 32 can include or be formed of a hydrophilic material, and upper surface 32c can be sloped at a sufficient curve or angle to minimize water droplets 102 or water accumulation on the upper surface 32c, and minimize its affect on the vibration of sensor member 32. The sensor member 32 can be formed of a polymeric material, such as plastic, which in some embodiments, can be an outdoor weatherable plastic such as amorphous terapolymer of acrylic-styrene-acrylonitrile (ASA) resin, or Geloy™. The perimeter 32a of the sensor member 32 can have a narrow, sharp or pointed edge 32d, that points, curves or angles downwardly to minimize the size and amount of water droplets 102 accumulating on the edge 32d. The edge 32d can extend radially beyond the side wall 20a of the upper housing 20 by a distance d so that precipitation 100 or water droplets 102 can be shed by sensor member 32 beyond the periphery of housing 20. The side wall 20a of housing 20 can be slightly sloped downwardly away from the upper surface 20c, and have a curved transitional surface 20b to join with a sloping upper surface 20c to also shed precipitation 100 or water droplets 102 from housing 20. The housing 20 can be generally round and have a lower flange 20d which engages a base 36. In some embodiments, a hydrophilic coating can also be applied to the upper surface 32c of sensor member 32 to minimize the formation of water droplets 102 on the upper surface 32c. Supporting the sensor member 32 with a post 34 generally at the center can also provide a configuration that can shed water readily.

The use of polymeric material or plastic for the sensor member 32 can provide a short vibration ring down time, or time period of vibration of sensor member 32 caused by an individual precipitation 100 strike. As a result, vibrations to sensor member 32 caused by individual precipitation strikes will be less likely to overlap with each other, and can be more easily identified as separate strikes. This can also help distinguish primary precipitation strikes from secondary strikes or splashes during heavy rain, which have different vibrations characteristics from a primary strike. Consequently, increased accuracy in sensing precipitation rate and amount can be obtained. The ring down time of a sensor member 32 formed of plastic can be shorter in time than a sensor member 32 formed of materials such as metal, for example stainless steel, since plastic is less stiff than stainless steel. For example, the tensile and flexural modulus of Geloy™ can range from 286,000 to 315,000 psi, while the modulus of elasticity E of stainless steel can be $28 \times 10^6$ psi. Also, polymeric material or plastics have more intrinsic mechanical damping than metals, and hence, vibrations dissipate more quickly, so that a sensor member 32 made of polymeric material or plastics can be considered to be formed from a vibration damping material, and can be considered to be vibrationally damped. This lessens the probability that the ring down from one precipitation 100 strike or raindrop might interfere with the ring down from another. In addition, the use of a plastic sensor member 32 mounted above weather subassembly 14 can avoid interference with GPS and compass component operations in the weather subassembly 14, which can occur with a metal or steel sensor member 32. In other embodiments, other materials can be used for sensor member 32, such as composites, or in some embodiments or configurations, there may be some situations where it is desirable to use metals, such as stainless steel. If desired, vibration damping material or structures can be attached, connected, added or applied to the sensor member 32 or the post 34 for vibrationally damping sensor member 32.

The central post 34 can be secured to, connected to, or extend from the underside surface 32b of the sensor member 32 downwardly at about the center or central region of the sensor member 32, and can be secured to connected to, or extend to the upper surface 20c of upper housing 20. The sensor member 32, post 34 and upper housing 20 can be connected together and aligned along a central vertical axis A, where the bottom 72 of the perimeter 32a of the sensor member 32 can be spaced from the upper surface 20c of the upper housing 20 by a gap $G_2$. The gap $G_2$ can be made large enough to prevent ice from building up and closing the gap $G_2$. The post 34 can have a diameter that is about ¼ the diameter of the sensor member 32, such that the wall 74 can extend radially outwardly from and beyond the post 34 to form an annular cantilevered wall portion 74a extending from the periphery of the post 34 to the outer perimeter 32a.

Referring to FIGS. 1-5, the post 34 can be constructed with a water tight construction, and can have an upper post portion 34a connected to, secured to, or extending downwardly from the underside surface 32b of the sensor member 32, and a bottom post portion 34b extending upwardly from the upper surface 20c of housing 20. The upper post portion 34a can be formed integrally with the sensor member 32 and can have a lower shoulder 34c and a neck 60 protruding from the shoulder 34c. The neck 60 can be generally "D" shaped (FIG. 4), and have a curved diameter portion 60b with a flat surface 60a on one side. The bottom post portion 34b can extend integrally from the upper surface 20c of housing 20. The neck 60 can engage a mating "D" shaped hole or opening 62 in the top of the bottom post portion 34b (FIG. 5) where the flat 60a and curved diameter portion 60b of neck 60 engages a corresponding flat 62a and curved diameter portion 62b of hole 62, and the flat axial distal end 60c of neck 60 can engage the flat bottom surface 62c of hole 62. The mating "D" shaped neck 60 and hole 62 can orient the sensor member 32 in the desired orientation relative to housing 20. In some embodiments, other shapes can be used. If desired, shoulder 34c of the upper post portion 32a can engage the upper rim surface 34d of the lower post portion 32b.

The upper post portion 34a can have a central opening hole or cavity 48 extending therethrough. The upper post portion 34a and the lower post portion 34b can be axially locked or secured together by a screw or bolt 46. The head of the screw 46 can be positioned in counterbore 48b and the threaded portion of screw 46 can extend through hole portion 48c of upper post portion 34a and into hole 64 at the bottom 60c of lower post portion 34b. The end of the threaded portion of screw 46 can engage a threaded hole 66a in a threaded plug or nut 66 positioned below or on the underside of the lower post portion 34b to tighten, clamp or lock the post portions 34a and 34b together. The upper portion of hole 48 can be covered and sealed in a water tight manner by a plug 44 pressed into counterbore 48b and an annular recess 48a in the counterbore 48b. The upper surface of the plug 44 can form part of the upper surface 32c of the sensor member 32. The bottom of counterbore 48b and the bottom 62c of hole 62 can have respective recesses 48d and 64a for receiving seals 54 and 56, such as "O" rings, for further sealing between the head of screw 46 and hole portion 48c, and between the distal end 60c and bottom surface 62c of the upper 34a and lower 34b post portions. In some embodiments, the post 34 can be attached to the underside surface 32b of sensor member 32 and to the upper surface 20c of housing 20, which can be by suitable fastening methods such as with fasteners, or with screw 46, and can be in one piece or more than two pieces.

The post 34 can have an electrical wire passage 58 with an upper passage portion 58a in upper post portion 34a, and a lower passage portion 58b in lower post portion 34b, through which electrical wires 40 connected to sensor 38 can extend to enter housing 20. The wires 40 can be held in place within housing 20 by a retainer or clip member 42 before connecting to electronics 30. The retainer member 42 can include two or double "O" rings to form a waterproof seal. The electronics 30 housed within housing 20 can be associated with the operation of the precipitation sensor 12 and the weather apparatus 10. The electronics 30 can be mounted to base 36 at the bottom of housing 20. Static electricity caused by precipitation 100 or rain striking the sensor member 32 can be dissipated to an electrical ground by forming the sensor member 32 from a conductive material, a slightly conductive plastic, or providing a conductive coating. The electrical charge can be dissipated through screw 46 and plug 66 to ground. In some embodiments, a ground wire can be attached to sensor member 32. Additionally, in some embodiments, screw 46 can be nonmetallic to minimize interference with GPS satellite signals, and a shield of a sensor cable, such as wires 40, can be connected to circuit ground. Such electrical grounding can prevent sudden electrical discharges or spurious electrical signals.

Figure 4:
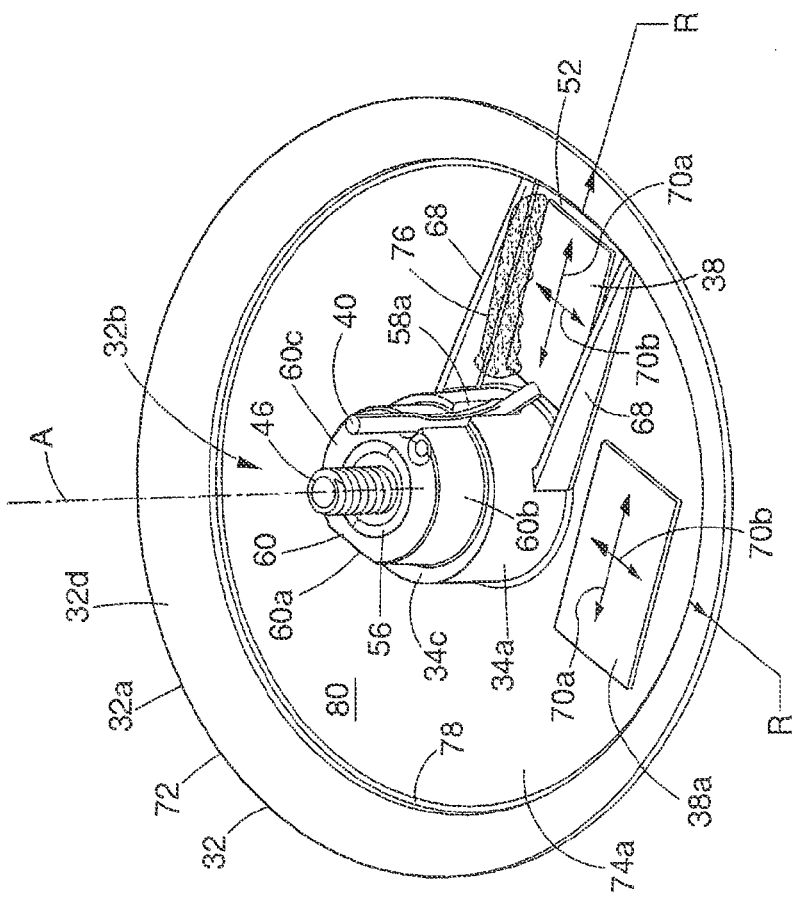
FIG. 4 is a perspective view of the bottom of an embodiment of a sensor member.

Referring to FIG. 4, the sensor 38 can be positioned or mounted within a recess or pocket 52 formed in or on the underside surface 32b of the sensor member 32 and annular cantilevered wall portion 74a. Raised structures such as ribs 68 can be positioned on opposite sides of the recess 52 and sensor 38, which can form boundary walls for containing a waterproof sealant or encapsulant 76. The encapsulant 76 can be soft or pliable, and provide a water tight sealing on or over, and around the sensor 38. The encapsulant 76 can be used as the adhesive to attach the sensor 38 to the sensor member 32, or alternatively, a separate adhesive can be used.

The sensor 38 can be a strain sensor formed of a piezoelectric polyvinylidene Flouride (PVDF) polymer film or strip, and can have high sensitivity in one direction or length 70a, and low or small sensitivity in a transverse or orthogonal direction or width 70b. This allows the sensor 38 to be mounted and aligned on the sensor member 32 where the sensitive direction 70a can be aligned with particular selected vibrations or resonance modes to be sensed, and the insensitive direction 70b can be aligned with vibrations or resonance modes that are not selected and not chosen to be sensed. This can be advantageous because the round perimeter 32a, the curved, convex upper surface 32c, concave underside surface 32b, sharp pointed edge 32d and thin walled annular cantilevered wall portion 74a of the sensor member 32 supported by post 34, can provide a shape or design that can vibrate simultaneously in multiple resonance modes. The different resonance modes can be in different directions and can have different magnitudes relative to each other. Usually only some of the resonance modes are used to detect precipitation, so that the sensor 38 can be positioned accordingly. Supporting the sensor member 32 with post 34 at about the center, can also allow the sensor member 32 and thin walled annular cantilevered wall portion 74a to vibrate or resonate from falling precipitation 100 at a sufficient level, magnitude or amount, so that the vibration modes used to indicate precipitation can be easily detected by sensor 38. This can be beneficial since a sensor member 32 made of a plastic can have a short vibration ring down time. Using a rigid post 34 can also help or contribute to allow the sensor member 32 to vibrate or resonate a sufficient level, magnitude or amount for detection. Alternatively, a non rigid, flexible, resilient or jointed support structure or post 34 can be used for certain situations. In addition, in some embodiments, sensor 38 can be a piezoelectric element that has uniform sensitivity in more than one direction, different directions, or all directions.

The underside surface 32b of sensor member 32 can be shaped or contoured with a generally flat portion 80 extending radially, thereby forming an annular flat. This can form an annular notch 78 between the flat portion 80 and the sharp pointed edge 32d at the outer perimeter 32a, which can be configured, shaped or dimensioned to tune the sensor member 32 to vibrate or resonate in a desired manner that can be used to detect falling precipitation. A generally flat or planar surface of the sensor 38 can be mounted and coupled in recess 52 to the flat portion 80 of the annular cantilevered wall portion 74a in planar surface contact, for planar surface to surface vibrational coupling. There can be some curvature of the polymer film of the sensor 38 to conform to the curve of the annular flat of flat portion 80. The sensor 38 can be generally rectangular in shape and be positioned in recess 52 with the length and sensitive direction 70a aligned in the direction radially outward or along the radius R of the sensor member 32, for sensing resonance modes or vibrations of sensor member 32 and annular cantilevered wall portion 74a, that are associated with falling precipitation 100. The width and insensitive direction 70b can be aligned transverse or orthogonal to direction 70a and radius R, where the sensor 38 does not sense vibrations in this direction. In this manner, the geometry of the sensor 38 and its position on sensor member 32 can create a spatial filter to preferentially select or enhance one or more vibration or resonance modes of the sensor member 32 and annular cantilevered portion 74a that are associated with falling precipitation 100, while filtering out vibration or resonance modes that are not associated with falling precipitation 100, or are not needed. In addition, attaching the sensor 38 to the annular cantilevered wall portion 74a can provide fast response time between the time that the precipitation 100 strikes the sensor member 32 and the time the vibrations are sensed by sensor 38, which can further aid in distinguishing between individual strikes. A thin walled plastic annular cantilevered wall portion 74a can therefore form a vibrating low mass annular cantilevered portion or member, that has fast response time between precipitation 100 strikes and vibrations sensed by sensor 38, and short vibration ring down times so that separate precipitation 100 strikes can be more easily distinguished from each other. Such an annular cantilevered wall portion 74a can also provide sufficiently large magnitude vibration or resonance characteristics along particular modes or directions indicating precipitation, so that the sensor 38 can detect those selected vibrations or modes.

In some embodiments, an additional or more than one sensor can be attached to the sensor member 32, such as at other desired locations of the underside surface 32b, for example, at locations opposite to sensor 38 (180°) as well as at 90° and/or 270° relative to sensor 38. Multiple sensors 38 and/or 38a can be used to determine the direction of precipitation 100 by detecting the signal from each sensor separately, and comparing the signals, for example signal magnitudes or time of arrival. In addition, the more than one sensor can be oriented in the same manner as sensor 38 is shown in FIG. 4, with the sensitive direction 70a aligned with radius R, or with the insensitive direction 70b aligned with radius R and the sensitive direction 70a orthogonal to radius R, to sense other vibrations if desired, as sensor 38a is shown in FIG. 4, or combinations thereof. In some embodiments, some sensors can align the sensitive direction 70a at intermediate angles or orientations relative to radius R or at other locations of sensor member 32. Although some embodiments of sensor 38 have been described to be a strain sensor or gauge formed of a piezoelectric polymer film, in other embodiments, the sensor 38 can be formed of ceramic, or can be a semiconductor device. In addition, other sensors can be used, such as accelerometers, MEMS devices, or optical devices for sensing precipitation. In some embodiments, sensors can be on the upper surface 32c of the sensor member 32 or embedded within the sensor member 32. Furthermore, in some embodiments, the sensor member 32 can in itself be a sensor, for example, a piezoelectric PVDF dome.

In some embodiments, the sensor 38 can sense vibrations or resonances of sensor member 32 that are at about 700 Hz, 1 kHz and 1.4 kHz. Changes in weather conditions, such as temperature can change or shift the resonance frequencies that the sensor member 32 vibrates. Changes in resonance frequencies due to changing weather conditions can be compensated for by experimentally premeasuring resonance frequencies over a range of changing weather conditions, and storing the information in memory, so that for certain weather conditions, such as changes in temperature measured by the weather apparatus 10, the precipitation sensor 12 can identify different particular adjusted or shifted frequencies as precipitation 100. Such resonance frequencies can also change with different dimensions or shapes of the sensor member 32. Frequencies for other weather conditions can also be premeasured if desired, such as for humidity or pressure.

In one embodiment, the sensor member 32 can have a perimeter 32a with an outer diameter of about 3 inches, and a height H of about ½ inches. The post 34 can be about ¾ inches in diameter, which can result in a wall 74 having an annular cantilevered portion 74a that extends beyond post 34 radially outward by about 1 inch. Wall 74 can have a thickness T along flat 80 which changes slightly in thickness moving from the post 34 radially outwardly to the annular notch 78 due to the curve of the upper surface 32c. For example, the thickness T can be near or about 1/16 of an inch near the post 34 and the annular notch 78, and near or about ⅛ of an inch in between, but can be varied as desired. A sensor member 32 of this size can be in a size range that is suitable for accurately measuring precipitation 100 properties. If the sensor member 32 is too small, there will not be enough precipitation 100 impacts in light precipitation or rain conditions to meet accuracy requirements. If the sensor member 32 is very large, it might sustain so many precipitation 100 impacts that individual impacts cannot be discerned, for example, in heavy rain conditions. Also, with such a sized sensor member 32, the total height of the weather apparatus 10 from the top of the sensor member 32 to the bottom of the threaded neck 18 can be about 6 inches or less. The diameter of the housings 20 and 16 can be about the same diameter as sensor member 32, making the weather apparatus 10, compact in size.

As is evident, the weather apparatus 10 can be installed at stationary land based sites. However, the compact size of weather apparatus 10 and an ability of sensor member 32 to measure precipitation even when not stationary or level, allows the weather apparatus 10 to be used in mobile applications and to be mounted to mobile vehicles or devices on land and water, such as trucks, farm equipment, ships, boats, buoys, etc. The GPS and compass components in the weather apparatus 10 can determine the location of precipitation or rain events sensed by the precipitation sensor 12, even when the weather apparatus 10 is moved to different locations or is on an unstable platform. The GPS components can also provide information to determine the travel speed of the weather apparatus 10 in mobile applications. Any effects caused by the travel speed can be compensated for, or corrected. Additionally, some properties of the sensor member 32 offer means to compensate for wind, without using data from a separate wind sensor. Humidity and barometric pressure sensors in the weather apparatus 10 can record the change in relative humidity and barometric pressure before and after a precipitation or rain event has occurred, which can be useful in dry climates. The humidity sensor can also be recalibrated in the field to indicate 100% humidity whenever the precipitation sensor 12 indicates that rainfall is occurring. Gyroscopes and accelerometers can be used to provide the orientation or tilt of the precipitation sensor 12 which can be useful in determining precipitation or rain direction, and can be used as tilt sensors and components. Tilting of the precipitation sensor 12 can be sensed, and any effects caused by such tilting can be compensated for, or corrected. Tilt can include pitch, roll and/or yaw.

Figure 6:
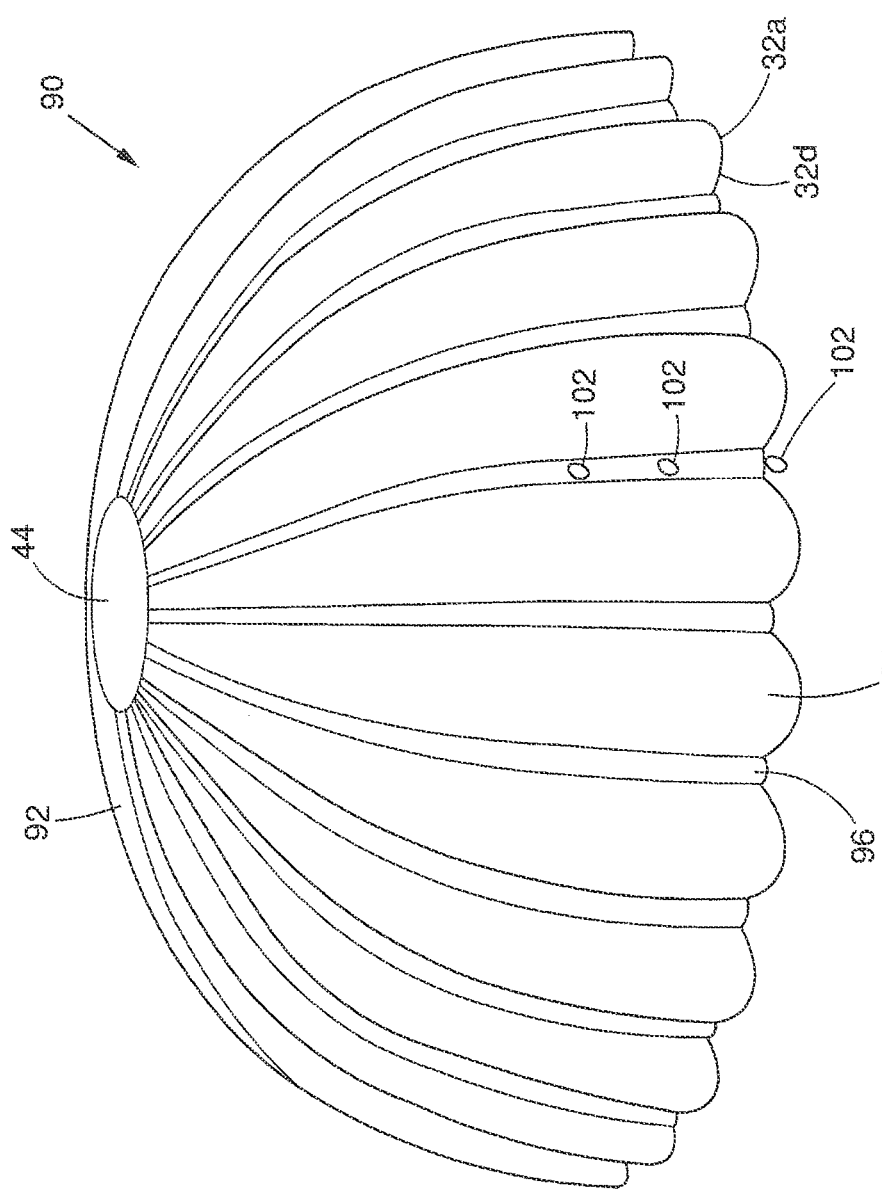
FIG. 6 is a front view of another embodiment of a sensor member.

Referring to FIG. 6, in another embodiment, sensor member 90 can replace sensor member 32, and differs from sensor member 32 in that the upper surface 92 of sensor member 90 can have a series of arched or corrugated ridges or segments 94 extending downwardly to the outer perimeter 32a. The arched segments 94 can arch both longitudinally and laterally outwardly, and can be separated from each other by smaller narrow segments 69 forming valleys, troughs or channels therebetween, thereby forming a scallop shell type structure with elongate arched or curved segments 94 where the arch widens moving toward the bottom. The upper surface 92 can have a steeper slope than upper surface 32c of sensor member 32 which can help shed precipitation 100 and water droplets 102 more readily from the edges 32d of the outer perimeter 32a. The arches of segments 94 can also direct precipitation 100 or rain, or water droplets 102 off the segments 94 laterally into the troughs formed by segments 96 that are between segments 94. The increase precipitation 100 or water droplets 102 directed into the troughs of segments 96 can cause precipitation 100 and water droplets 102 to be more readily shed off from the edge 32d.

In some embodiments of sensor member 32 and 90, the post 34 can be replaced with a support structure having more than one post, which can be near the center, or moved closer to the outer perimeter 32a, or can be an annular support structure. In other embodiments, the support structure can be an offset post or structure asymmetrically mounted relative to the sensor member 32 or 90. The support structure can be mounted at about, generally in, or around the central region of the sensor member but in an asymmetrical location. Although post 34 has been described to be rigid, in some embodiments, post 34 can be flexible or resilient. In some embodiments, the sensor 38 can be periodically energized to vibrate the sensor member 32 or 90, to shake excess water off. Although sensor members 32 and 90 have been shown to have generally circular outer perimeters, in some embodiments, sensor members can be employed which have outer perimeters with other suitable shapes, for example, oval, square, rectangular or bar shaped, shapes having curves, or shapes having a combination of curved and straight perimeter edges.

Figure 7:
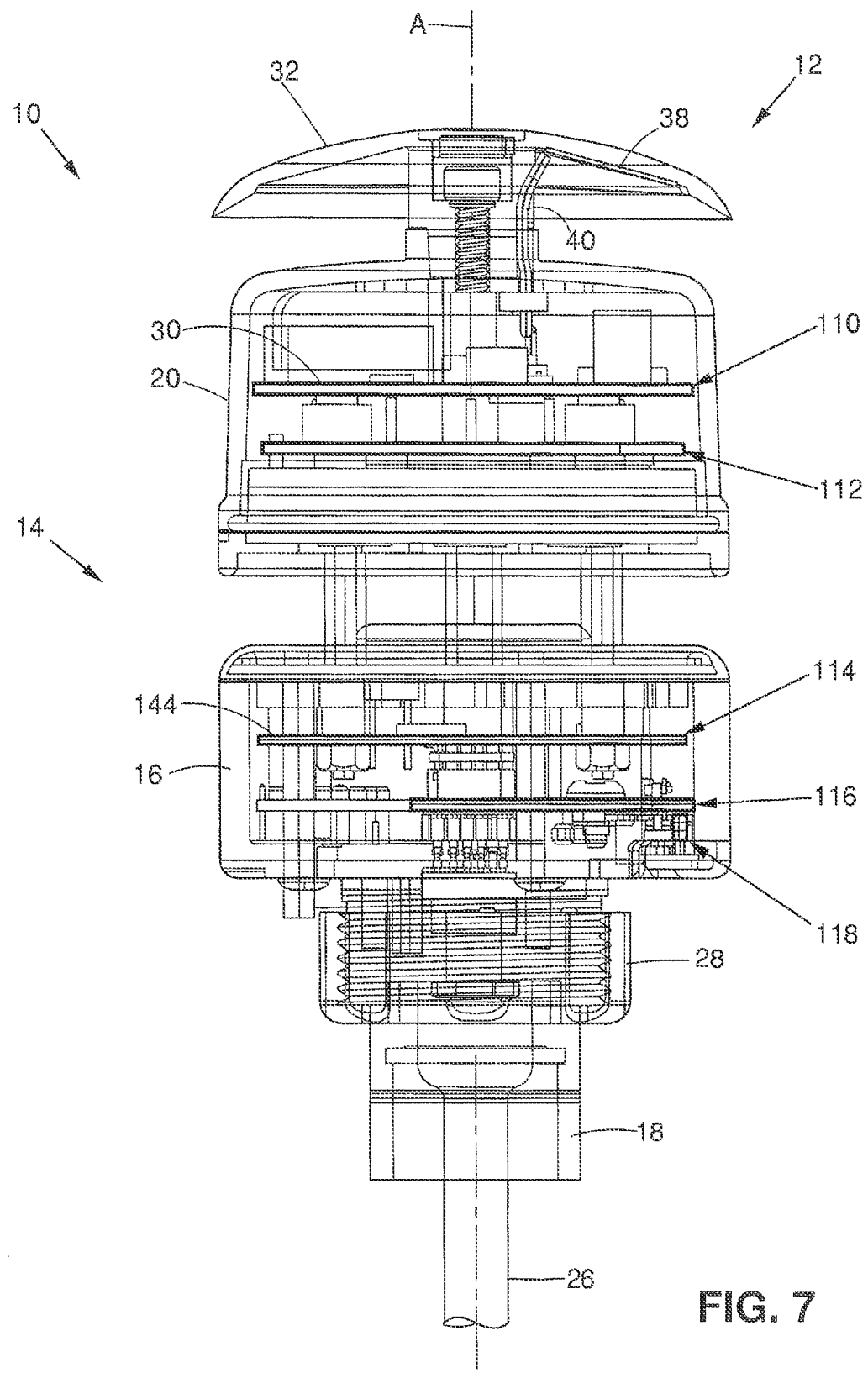
FIG. 7 is a sectional view of an embodiment of a weather apparatus showing circuit board locations.
Figure 8:
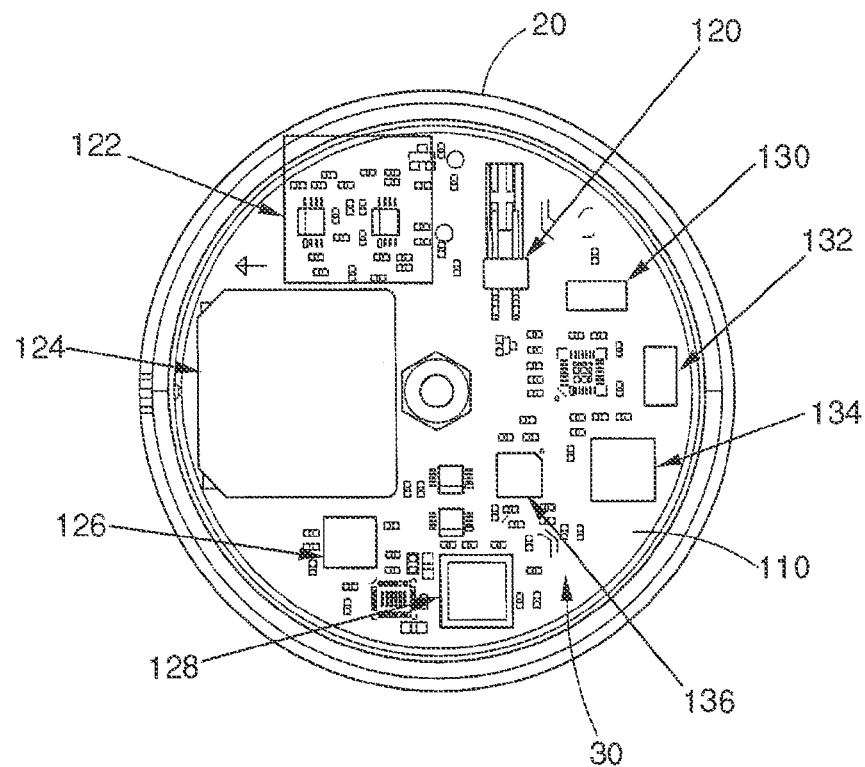
FIG. 8 is a top view of an embodiment of an upper circuit board positioned within the upper housing.
Figure 9:
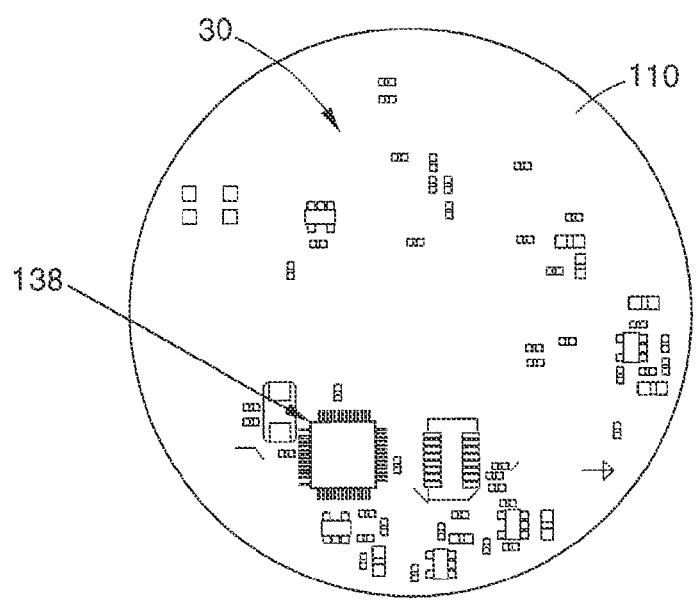
FIG. 9 is a bottom view of the upper circuit board of FIG. 8.
Figure 10:
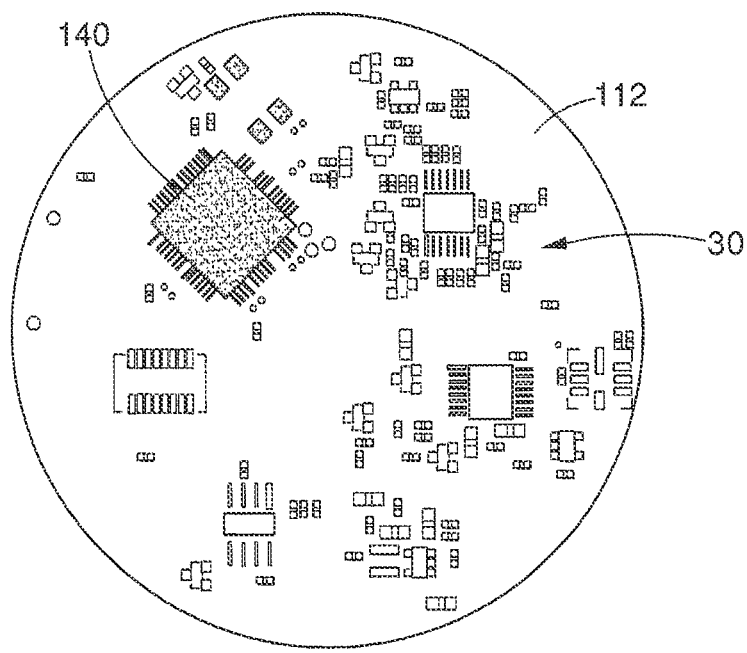
FIG. 10 is a top view of an embodiment of a middle circuit board.
Figure 11:
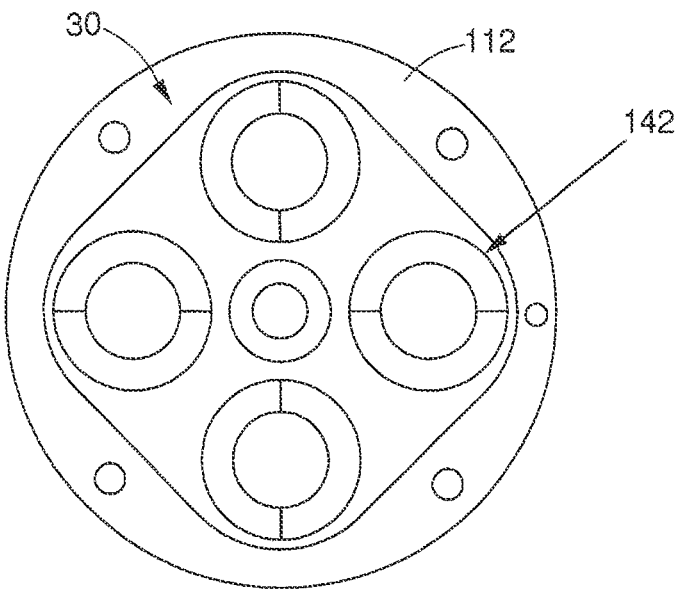
FIG. 11 is a bottom view of the middle circuit board of FIG. 10.

Referring to FIGS. 7 and 8, in one embodiment, weather apparatus 10 can have electronics 30 in the upper housing 20 that includes an upper circuit board 110 and a middle circuit board 112 positioned below the upper circuit board 110. The upper board 110 can include a connector 120 for connecting to the electrical wires 40 extending from sensor 38, a pre-amp and filter region 122, a GPS sensor, components or electronics 124, a pitch and roll rate gyro 126, a yaw rate gyro 128, a y-axis magnetometer 130, an x-axis magnetometer 132, a z-axis magnetometer 134, a 3-axis accelerometer 136, which can be on the top (FIG. 8), and an ARM processor (compass) which can be on the bottom (FIG. 9). The middle board 112 can include a slave processor 140, which can be on the top (FIG. 10), and acoustic sensors 142, for example, four, which can be on the bottom (FIG. 11).

Figure 12:
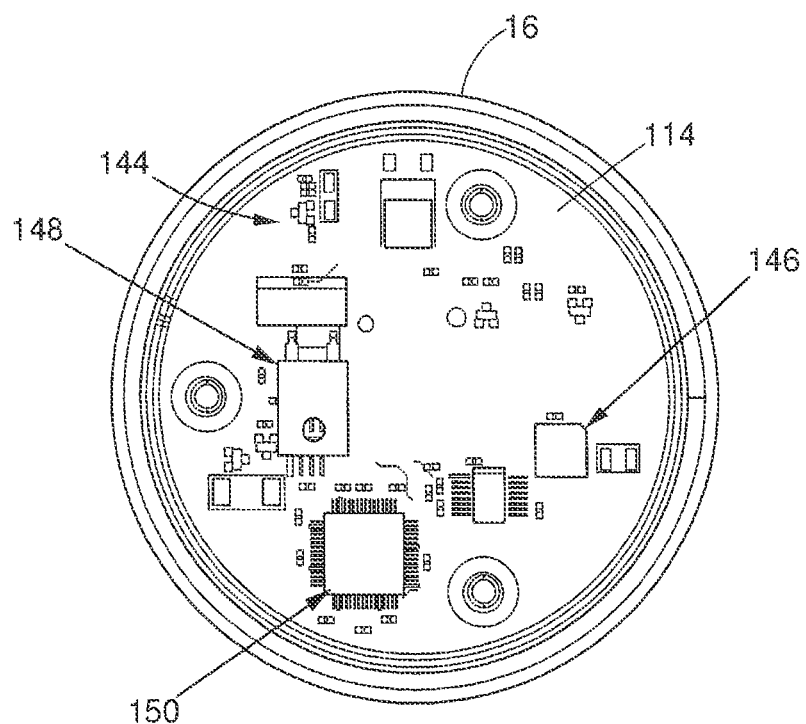
FIG. 12 is a top view of an embodiment of a lower circuit board.
Figure 13:
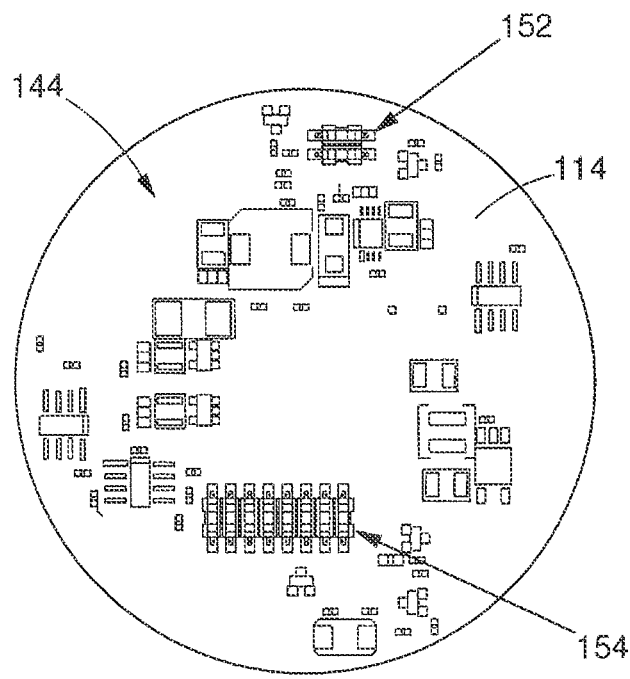
FIG. 13 is a bottom view of the lower circuit board of FIG. 12.
Figure 14:
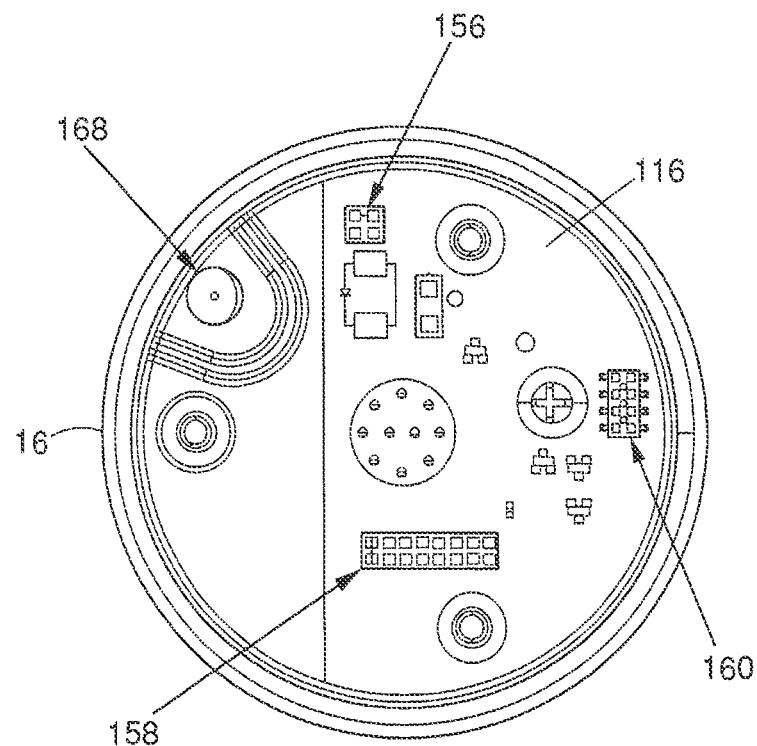
FIG. 14 is a top view of an embodiment of an interconnection circuit board positioned within the lower housing.
Figure 15:
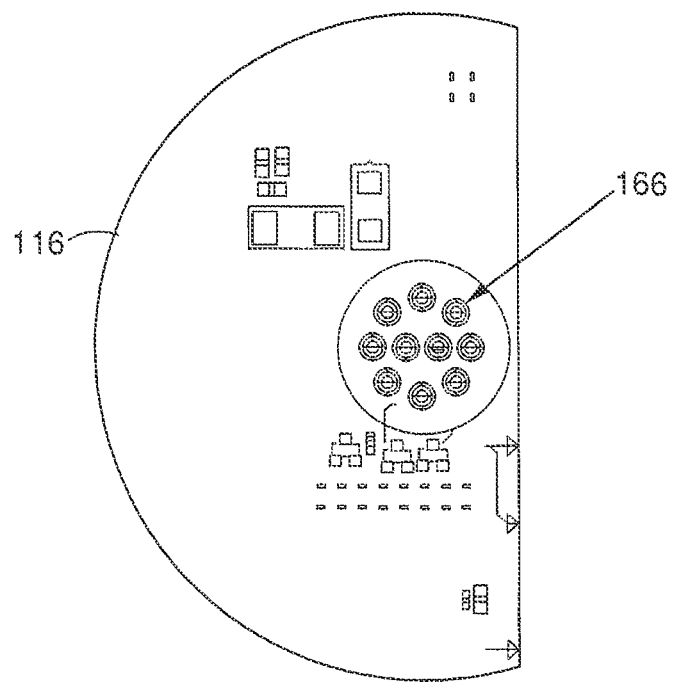
FIG. 15 is a bottom view of the interconnection circuit board of FIG. 14.
Figure 16:
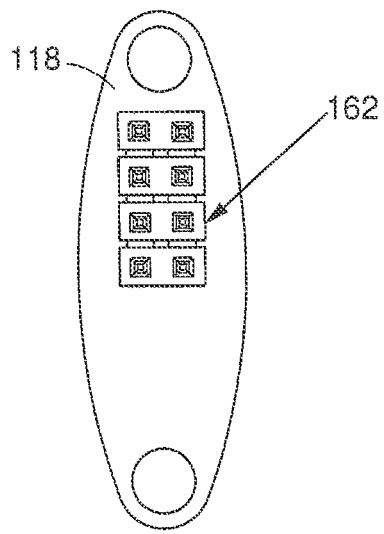
FIG. 16 is a top view of an embodiment of a humidity and temperature circuit board.
Figure 17:
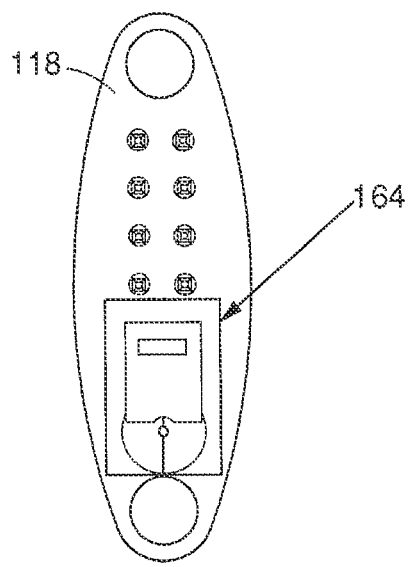
FIG. 17 is a bottom view of the humidity and temperature circuit board of FIG. 16.

The weather apparatus 10 can also have electronics 144 within lower housing 16, which can include a lower circuit board 114, an interconnection circuit board 116, and a humidity and temperature circuit board 118 on the interconnection board 116, positioned within lower housing 16. The lower board 114 can have a barometric pressure sensor 146, a power film resister 148, an ARM master processor 150, which can be on the top (FIG. 12), a connector 152 for an optional heater and a connector 154 for sensor power and communication, which can be on the bottom (FIG. 13). The interconnection board 116 can have on top (FIG. 14), a connector for an optional heater 156, a connector 158 for sensor power and communication, and a connector 160 for connecting to connector 162 on the humidity and temperature board 118 for connecting to a humidity and temperature sensor 164 (FIGS. 16 and 17). A series of male contacts 166 for connecting the interconnection board 116 with power and communications, such as via cable 26, can be on the bottom (FIG. 15). Another temperature sensor 168 can be positioned adjacent to the interconnection board 116.

While this invention has been particularly shown and described with references to example embodiments thereof, it will be understood by those skilled in the art that various changes in form and details may be made therein without departing from the scope of the invention encompassed by the appended claims. Various features described shown can be omitted or combined. In addition, it is understood that sizes, shapes and dimensions of the components can vary.

What is claimed is:

1. A precipitation sensor comprising:
a sensor member having an upper surface and a lower surface extending on opposite sides, the sensor member for receiving falling precipitation on the upper surface and vibrating when struck by such precipitation, and being sloped for shedding the precipitation;
a vibration sensor incorporated with at least a part of the sensor member for sensing vibrations of the sensor member caused by the precipitation, and generating an electrical response from which precipitation properties can be determined;
a temperature sensor for measuring temperature; and
processing electronics for processing the electrical response from the vibration sensor into precipitation properties, the processing electronics including a memory having stored information on changing resonance frequencies of the sensor member over changing temperatures, the processing electronics using the stored information to compensate for temperature effects on the sensor member based on temperature measured by the temperature sensor.

2. The sensor of claim 1 in which the stored information is used to identify resonance frequencies changed by changes in temperature as precipitation.

3. The sensor of claim 1 in which the sensor member is a cantilevered sensor member having a cantilevered portion, the upper and lower surfaces extending on opposite sides of the cantilevered portion, the cantilevered portion having outer perimeter edges that are sloped downwardly for shedding precipitation off the cantilevered portion, a support structure being connected to the lower surface of the cantilevered portion at about a central region of the sensor member for supporting the sensor member, the cantilevered portion extending outwardly beyond the support structure.

4. The sensor of claim 3 in which the support structure is a rigid support structure for rigidly supporting the sensor member.

5. The sensor of claim 4 in which the sensor member has a generally round outer perimeter.

6. The sensor of claim 3 in which the support structure comprises a post supporting the sensor member at about the central region, whereby the cantilevered portion of the sensor member is generally annular.

7. The sensor of claim 5 in which the precipitation comprises rain, the outer perimeter of the cantilevered portion having a sharp edge for minimizing water droplet size hanging on the edge of the outer perimeter by surface tension.

8. The sensor of claim 1 in which the vibration sensor comprises a strain sensor attached to the lower surface of the sensor member.

9. The sensor of claim 8 in which the strain sensor is a piezoelectric polymer strip, the piezoelectric polymer strip having one direction with high sensitivity, and another direction with low sensitivity, the piezoelectric polymer strip being oriented to align the direction having high sensitivity with selected vibrations.

10. The sensor of claim 9 in which the piezoelectric polymer strip is oriented to select a particular resonance mode of the sensor member.

11. The sensor of claim 8 in which more than one strain sensor is attached to the sensor member, the electrical response of the more than one strain sensor being capable of being compared with each other.

12. The sensor of claim 1 in which the precipitation sensor is mounted to a weather sensor assembly by the support structure, the weather sensor assembly including sensors for determining one or more of GPS location, travel speed, tilt, compass heading, humidity, barometric pressure, temperature, wind speed and wind direction.

13. The sensor of claim 3 in which the support structure is connected to the lower surface of the sensor member at an asymmetrical location.

14. The sensor of claim 1 in which the sensor member is vibrationally damped.

15. The sensor of claim 14 in which the sensor member is formed of vibrationally damped material.

16. The sensor of claim 15 in which the sensor member is formed of polymeric material.

17. A precipitation sensor comprising:
a cantilevered sensor member having a cantilevered portion and an upper surface and a lower surface extending on opposite sides of the cantilevered portion, the sensor member for receiving falling precipitation on the upper surface and vibrating when struck by such precipitation, the cantilevered portion having a generally round outer perimeter with outer perimeter edges that are sloped downwardly for shedding the precipitation off the cantilevered portion;
a piezoelectric sensor attached to the lower surface of the cantilevered portion of the sensor member for sensing vibrations of the sensor member caused by the precipitation, and generating an electrical response from which precipitation properties can be determined;
a rigid post connected to the lower surface of the cantilevered portion at about a central region of the sensor member for rigidly supporting the sensor member, the cantilevered portion being generally annular and extending outwardly beyond the support structure;
a temperature sensor for measuring temperature; and
processing electronics for processing the electrical response from the piezoelectric sensor into precipitation properties, the processing electronics including a memory having stored information on changing resonance frequencies of the sensor member over changing temperatures, the processing electronics using the stored information to compensate for temperature effects on the sensor member based on temperature measured by the temperature sensor, and identifying resonance frequencies changed by changes in temperature as precipitation.

18. A precipitation sensor comprising:
a sensor member having an upper surface and a lower surface extending on opposite sides, the sensor member for receiving falling precipitation on the upper surface and vibrating when struck by such precipitation, and being sloped for shedding the precipitation;
a vibration sensor incorporated with at least a part of the sensor member for sensing vibrations of the sensor member caused by the precipitation, and generating an electrical response from which precipitation properties can be determined;
a temperature sensor for measuring temperature; and
processing electronics for processing the electrical response from the vibration sensor into precipitation properties, the processing electronics including a memory having stored information on changing properties of the sensor member over changing temperatures, the processing electronics using the stored information to compensate for temperature effects on the sensor member based on temperature measured by the temperature sensor.

19. A method of sensing precipitation comprising:
vibrating a sensor member with falling precipitation, the sensor member having an upper surface and a lower surface extending on opposite sides, the sensor member for receiving falling precipitation on the upper surface and vibrating when struck by such precipitation, and being sloped for shedding the precipitation;
sensing vibrations of the sensor member caused by the precipitation with a vibration sensor incorporated with at least a part of the sensor member, and generating an electrical response from which precipitation properties can be determined;
measuring temperature with a temperature sensor; and
processing the electrical response from the vibration sensor into precipitation properties with processing electronics, the processing electronics including a memory having stored information on changing resonance frequencies of the sensor member over changing temperatures, the processing electronics using the stored information to compensate for temperature effects on the sensor member based on temperature measured by the temperature sensor.

20. The method of claim 19 further comprising using the stored information to identify resonance frequencies changed by changes in temperature as precipitation.

21. The method of claim 19 in which the sensor member is a cantilevered sensor member having a cantilevered portion, the upper and lower surfaces extending on opposite sides of the cantilevered portion, the cantilevered portion having outer perimeter edges that are sloped downwardly for shedding precipitation off the cantilevered portion, the method further comprising supporting the sensor member with a support structure connected to the lower surface of the cantilevered portion at about a central region of the sensor member, the cantilevered portion extending outwardly beyond the support structure.

22. The method of claim 21 further comprising rigidly supporting the sensor member with a rigid support member.

23. The method of claim 22 further comprising providing the sensor member with a generally round outer perimeter.

24. The method of claim 21 further comprising supporting the sensor member at about the central region with a post, whereby the cantilevered portion of the sensor member is generally annular.

25. The method of claim 23 in which the precipitation comprises rain, the method further comprising minimizing water droplet size hanging on the edge of the outer perimeter by surface tension, by providing the outer perimeter of the cantilevered portion with a sharp edge.

26. The method of claim 19 further comprising attaching a strain sensor to the lower surface of the sensor member.

27. The method of claim 26 in which the strain sensor is a piezoelectric polymer strip, the piezoelectric polymer strip having one direction with high sensitivity, and another direction with low sensitivity, the method further comprising orienting the piezoelectric polymer strip to align the direction having high sensitivity with selected vibrations.

28. The method of claim 27 further comprising orienting the piezoelectric polymer strip to select a particular resonance mode of the sensor member.

29. The method of claim 26 further comprising attaching more than one strain sensor to the sensor member, the electrical response of the more than one strain sensor being capable of being compared with each other.

30. The method of claim 19 further comprising mounting the precipitation sensor to a weather sensor assembly with the support structure, the weather sensor assembly including sensors for determining one or more of GPS location, travel speed, tilt, compass heading, humidity, barometric pressure, temperature, wind speed and wind direction.

31. The method of claim 21 further comprising connecting the support structure to the lower surface of the sensor member at an asymmetrical location.

32. The method of claim 19 further comprising vibrationally damping the sensor member.

33. The method of claim 32 further comprising forming the sensor member from vibrationally damped material.

34. The method of claim 33 further comprising forming the sensor member from polymeric material.

35. A method of sensing precipitation comprising:
vibrating a sensor member with falling precipitation, the sensor member having an upper surface and a lower surface extending on opposite sides, the sensor member for receiving falling precipitation on the upper surface and vibrating when struck by such precipitation, and being sloped for shedding the precipitation;
sensing vibrations of the sensor member caused by the precipitation with a vibration sensor incorporated with at least a part of the sensor member, and generating an electrical response from which precipitation properties can be determined;
measuring temperature with a temperature sensor; and
processing the electrical response from the vibration sensor into precipitation properties with processing electronics, the processing electronics including a memory having stored information on changing properties of the sensor member over changing temperatures, the processing electronics using the stored information to compensate for temperature effects on the sensor member based on temperature measured by the temperature sensor.

* * * * *